(12) United States Patent
Agrawal et al.

(10) Patent No.: US 6,687,705 B2
(45) Date of Patent: Feb. 3, 2004

(54) METHOD AND SYSTEM FOR MERGING HIERARCHIES

(75) Inventors: Rakesh Agrawal, San Jose, CA (US); Ramakrishnan Srikant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 09/757,047

(22) Filed: Jan. 8, 2001

(65) Prior Publication Data

US 2002/0091676 A1 Jul. 11, 2002

(51) Int. Cl.[7] .............................................. G06F 17/30
(52) U.S. Cl. ................................ 707/101; 707/6; 707/7
(58) Field of Search ........................... 707/6, 7, 3, 100, 707/101, 102; 706/45

(56) References Cited

U.S. PATENT DOCUMENTS

| | | | |
|---|---|---|---|
| 5,930,803 A | * 7/1999 | Becker et al. | 707/104.1 |
| 6,026,399 A | * 2/2000 | Kohavi et al. | 707/6 |
| 6,182,058 B1 | * 1/2001 | Kohavi | 706/45 |
| 6,301,579 B1 | * 10/2001 | Becker | 707/102 |
| 6,460,049 B1 | * 10/2002 | Becker et al. | 707/100 |
| 2002/0091676 A1 | * 7/2002 | Agrawal et al. | 707/2 |

OTHER PUBLICATIONS

Nurnberger et al., "improving Naive Bayes Classifiers Using Neuro Fuzzy learning" IEEE, pp–154159, Jan. 1999.*
Li et al., "Classification of text documents", IEEE, pp. 1–3.*
Huang et al., "Bayesian classification for data from the same unknown class", IEEE, pp. 137–145, vol. 32, No. 2, Apr. 2002.*
Liu et al., "An improved Naive Bayesian classifier technique coupled with a novel input solution method", IEEE, vol. 31, No. 2, pp. 249–256, May 2001.*

* cited by examiner

Primary Examiner—Jean M. Corrielus
(74) Attorney, Agent, or Firm—John L. Rogitz

(57) ABSTRACT

A system and method for merging product information from a first hierarchy into a second hierarchy. A Naive Bayes classification model is generated using both text data and attribute (numerical) data pertaining to products in the second hierarchy. Then, products in the first hierarchy are placed into the second hierarchy in accordance with the model. Preferably, the placement of the products in the second hierarchy depends in part on their grouping in the first hierarchy, on the intuition that if two products were grouped together in the first hierarchy they have a higher likelihood of being grouped together in the second hierarchy as well.

20 Claims, 2 Drawing Sheets

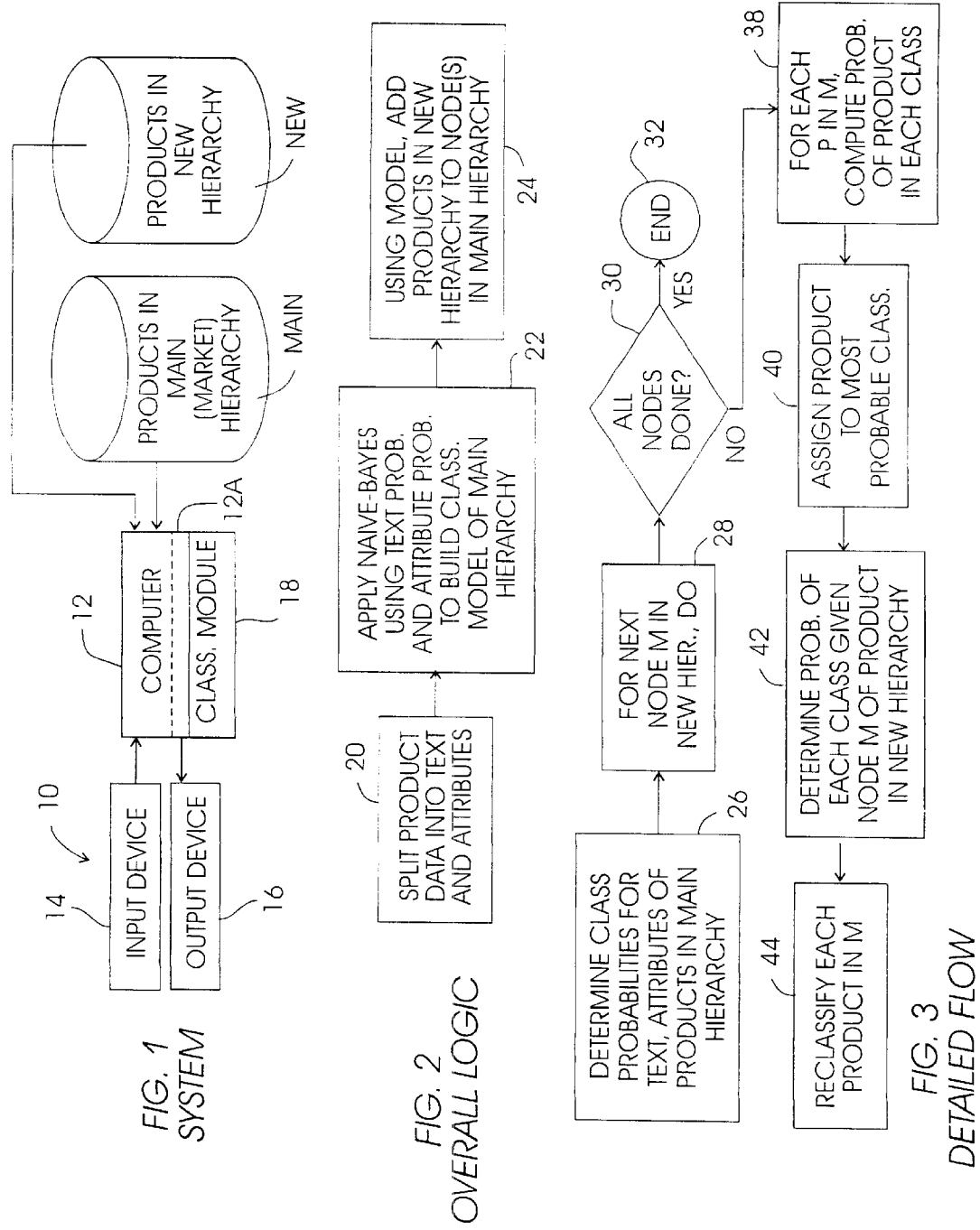

SOME OPTIMIZATIONS

METHOD AND SYSTEM FOR MERGING HIERARCHIES

BACKGROUND OF THE INVENTION

1. Field of the Invention

The present invention relates to merging hierarchies of products.

2. Description of the Related Art

The explosive progress in computer networking, data storage, and processor speed has enabled large amounts of transactions, including Web-based transactions. To support transactional applications, hierarchies are used to arrange product information in a way that promotes fast and efficient processing of transactions. As but one non-limiting example, a Web merchant might maintain a hierarchy of electronics products, with camera information being stored in a "camera" node, printer information being stored at a "printer" node, and so on. Each node can have sub-nodes, e.g., the "camera" node can have a "digital camera" sub-node and a "non-digital camera" subnode. When a person indicates a desire to purchase a digital camera, the Web server accesses the camera node to present the data therein to the user.

It is conventionally the case that the hierarchy of a Web site is manually constructed, with a person placing the appropriate information in the appropriate place in the hierarchy. When a new manufacturer joins the marketplace that is defined by the Web site, the products of the new manufacturer must be placed in the appropriate nodes of the main hierarchy. If the new manufacturer happens to use exactly the same hierarchical scheme as the main hierarchy, this is trivial, since the new products map exactly from their node to a corresponding node in the main hierarchy. However, if the two hierarchical schemes are not the same, which is typically the case, merging the hierarchies becomes non-trivial.

Heretofore, although non-trivial, merging two hierarchies has not been a programming problem since the new hierarchy simply is manually merged with the main (market) hierarchy by a person adding the products from the new hierarchy into the appropriate nodes in the main hierarchy. Nonetheless, as can be recognized as a consequence of the above discussion, it is unfortunately the case that constructing the main hierarchy and merging products from new hierarchies into the main hierarchy is slow and labor intensive. The present invention accordingly has recognized a critical need to automatically merge products from one hierarchy into another, differently-constructed hierarchy.

SUMMARY OF THE INVENTION

The invention is a general purpose computer programmed according to the inventive steps herein to merge products from two or more hierarchies into a single hierarchy. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below.

Accordingly, a computer-implemented method is disclosed for merging product information in a first hierarchy having a first structure into a second hierarchy having a second structure different than the first structure. The method includes generating a classifier, preferably a Naive-Bayes classifier, using text and attributes associated with product information in the second hierarchy. The method also includes using the classifier to associate product information in the first hierarchy with nodes in the second hierarchy. More specifically, product information on a product in the first hierarchy is associated with at least one node in the second hierarchy corresponding to a highest classification probability for that product.

In a preferred embodiment, the generating act includes multiplying a probability based on product information text by a probability based on product information attributes. If desired, a product in the first hierarchy can be associated with at least two high score nodes in the second hierarchy when each high score node corresponds to a classification probability exceeding a threshold. Conversely, product information on a low score product in the first hierarchy is not associated with a node in the second hierarchy when no node in the second hierarchy is associated with a classification probability exceeding a threshold. A low score node in the first hierarchy is designated as a node in the second hierarchy when the low score node contains at least a threshold number of low score products.

As set forth in greater detail below, the present invention recognizes the intuition that if two products were grouped together in the first hierarchy they have a higher likelihood of being grouped together in the second hierarchy as well. Accordingly, product information on a product from a first node in the first hierarchy can be associated with a second node in the second hierarchy based on how many products in the first node have been associated with the second node.

In another aspect, a computer system includes a program of instructions that in turn includes structure to undertake system acts. These system acts include receiving a main hierarchy having nodes representing product classes, and receiving a new hierarchy having nodes representing product classes. A Naive-Bayes classifier is generated using the main hierarchy, and then products in the new hierarchy are associated with nodes in the main hierarchy using the classifier.

In yet another aspect, a system storage device includes system readable code that can be read by a computer for associating products in a new hierarchy with product classification nodes in a main hierarchy. The storage device includes computer readable code means for generating a Naive Bayes classifier based on hierarchy training data containing both text and numerical attributes. Also, computer readable code means are provided for using the classifier and a determination of how many products in at least a first node in the new hierarchy are associated with at least a second node in the main hierarchy to associate products in the new hierarchy with product classification nodes in the main hierarchy.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system architecture;

FIG. 2 is a flow chart of the overall logic;

FIG. 3 is a flow chart of a preferred logic; and

DETAILED DESCRIPTION OF THE PREFERRED EMBODIMENTS

Figure 4:
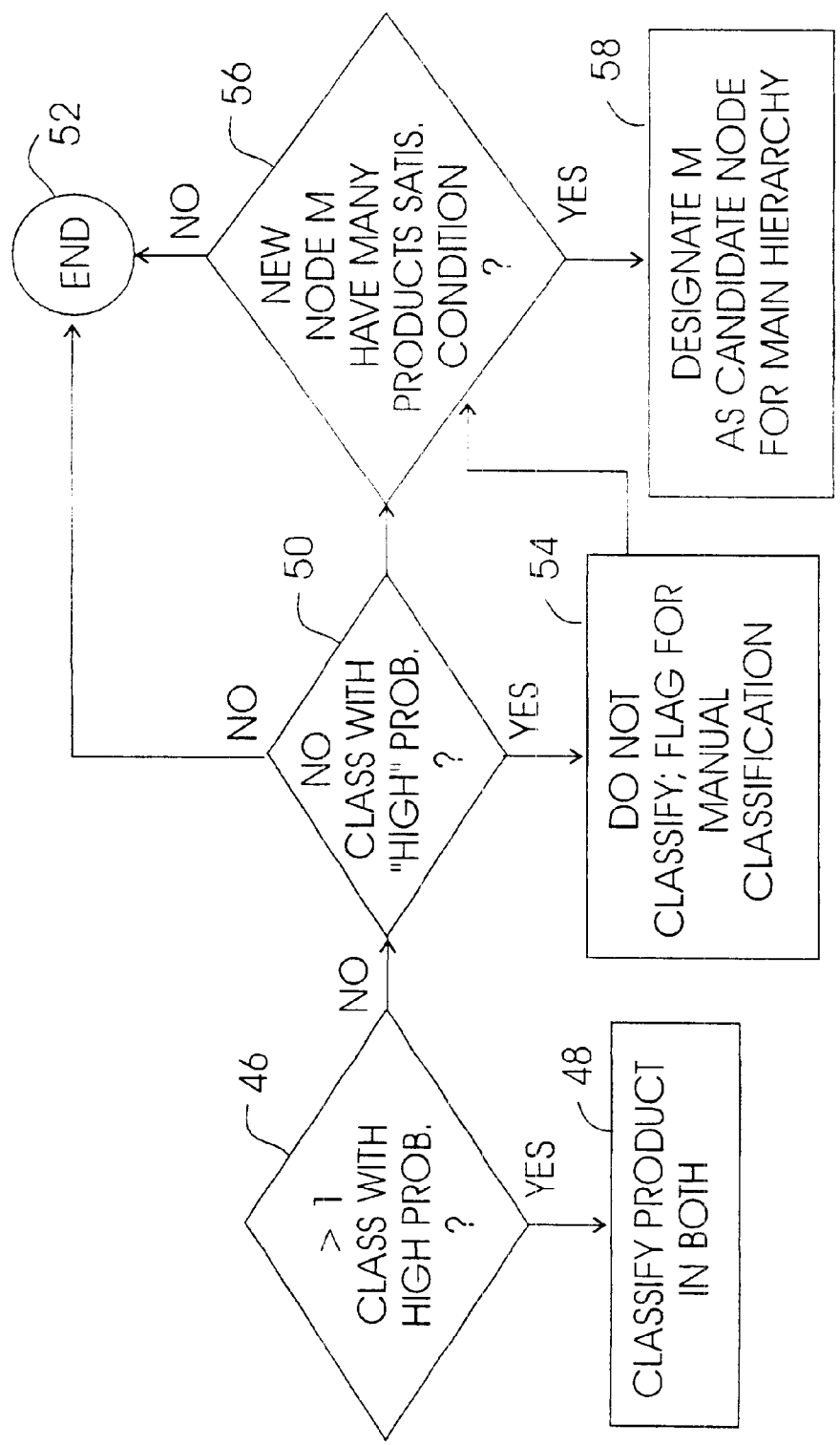
FIG. 4 is a flow chart of the logic for optimizing the present invention.

Referring initially to FIG. 1, a system is shown, generally designated 10, for merging data from plural hierarchies, at least two of which are shown in FIG. 1 and designated "main" and "new". While two product hierarchies are discussed herein, it is to be understood that more than two hierarchies can be merged using present principles, and that the present invention applies to "product" hierarchies in the broadest sense, e.g., a "product" could be almost any data record that might be stored in a hierarchy.

A computer 12 includes an input device 14, such as a keyboard or mouse, for inputting data to the computer 12, as well as an output device 16, such as a monitor. The computer 12 can be a Web server or other computer that communicates with the hierarchies as shown in FIG. 1.

The computer 12 can be a personal computer made by International Business Machines Corporation (IBM) of Armonk, N.Y. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as printers, other computers or data storage devices, and computer networks.

In any case, the processor of the user computer 12 accesses a classification module 18 to undertake certain of the logic of the present invention. The module 18 may be executed by a processor as a series of computer-executable instructions. The instructions may be contained on a data storage device with a computer readable medium, such as a computer diskette having a computer usable medium with code elements stored thereon. Or, the instructions may be stored on random access memory (RAM) 12A of the computer 12, on a DASD array, or on magnetic tape, conventional hard disk drive, electronic read-only memory, optical storage device, or other appropriate data storage device. In an illustrative embodiment of the invention, the computer-executable instructions may be lines of C++ code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Now referring to FIG. 2, the overall logic of the present invention can be seen. Product information pertaining to products in the main hierarchy is split into textual information and attributes, either categorical or numerical. For example, suppose a product is a camera having, as an attribute, a resolution having a value, and having a name. The name is textual and the attribute, resolution, is numerical, and it has a value.

Moving to block 22, a classifier is generated using the product information obtained at block 20. The classification preferably is generated using a Naive-Bayes rule as detailed further below, although other classifiers, such as decision tree classifiers, can also be used. As indicated at block 22, the classifier is generated using probabilities related to product information text occurrences and product information attribute occurrences, and it is trained using the product information in the main hierarchy. If no products initially exist in the main hierarchy, a training set of data can be provided.

Proceeding to block 24 in the overall logic, the invention next uses the classifier generated at block 22 to associate products in the new hierarchy with nodes in the main hierarchy. A preferred implementation of this is discussed further below. In this way, the hierarchies are merged.

FIG. 3 shows the details of one preferred implementation, which uses Naive-Bayes principles as modified herein to merge two hierarchies. Commencing at block 26, the classes $C_i$ of data are determined by the nodes in the main hierarchy, and then the relative posterior probability $Pr(C_i|p)$ of class $C_i$ given a product p is determined using Bayes' rule modified as follows: $Pr(C_i|p)=Pr(C_i)Pr(p|C_i)$, where $Pr(C_i)$ equals the number of products in the $i^{th}$ class $C_i$ divided by the total number of products in the main hierarchy, and wherein the probability $Pr(p|C_i)$ is obtained using probabilities based on numerical attributes combined with probabilities based on text attributes. Specifically, $Pr(p|C_i)=Pr(p_{text}|C_i) \times Pr(p_{text}|C_i)$, where $p_{text}$ is a textual portion of a product and Pat is a numerical attribute portion of a product. The right side of the above equation can be rewritten as $\prod_{w \in p_{text}} Pr(w|C_i)$ multiplied by $\prod_{A_j \in p_{attr}} Pr(A_j=v_k|C_i)$, where "w" is a word in the text portion $p_{text}$ and $v_k$ is the $k^{th}$ value interval of the $j^{th}$ attribute $A_j$ of the attribute portion $p_{attr}$.

With more specificity, in obtaining $Pr(w|C_i)$, the frequency of occurrence of every word appearing in any of the textual descriptions of the set of products in the $i^{th}$ node $C_i$ is computed. If $n(C_i,w)$ is the number of occurrences of word "w" in class $C_i$, and $n(C_i)$ is the total number of words in the class $C_i$, the maximum likelihood estimate for $Pr(w|C_i)$ is $n(C_i,w)/n(C_i)$. However, the present invention understands that using this estimate would give a probability of zero for any word that does not occur in the class, and thus result in $Pr(p|C_i)$ being zero for any product p that contains a word not present in the class $C_i$. Accordingly, it is preferably to "smooth" the maximum likelihood estimate with Laplace's law of succession, or more preferably with Lidstone's law of succession for heterogenous datasets. For an optimal value of $\lambda$ selected by randomly selecting a subset of the main hierarchy and computing the accuracy of the model for various values of $\lambda$, $Pr(w|C_i)=\{n(C_i,w)+\lambda\}/\{n(C_i)+\lambda|V|\}$, where V is the number of words in the entire dataset.

On the other hand, for the numeric attribute portion, the possible values of each attribute are discretized into intervals, such that $v_k$ for an attribute represents the $k^{th}$ value interval for the attribute. If $n(C_i, A_j=v_k)$ is the number of products in class $C_i$ for which attribute $A_j$ has a value in the interval $v_k$, $|C_i|$ is the number of products in class $C_i$, and $|A_j|$ is the number of possible values for attribute $A_j$, using the Lidstone correction:

$$Pr(A_j=v_k|C_i)=\{n(C_i, A_j=v_k)+\lambda\}/\{|C_i|+\lambda|A_j|\}, \lambda \geq 0.$$

The above equation is used for categorical attributes, except that $v_k$ represents the $k^{th}$ value in the set of possible values for the categorical attribute.

The equations above are used to generate the preferred Naive-Bayes classifier using the products in the main hierarchy as the training set. Specifically, at block 26, $Pr(C_i)$, $Pr(w|C_i)$, and $Pr(A_j=v_k|C_i)$ are determined. Moving to block 28, a DO loop is entered for each node M in the new hierarchy. At decision diamond 30 it is determined whether all nodes have been tested and if so the process ends at state 32. Otherwise, for each product in the node M under test, at block 38 the probabilities $Pr(C_i|p)$ of the product in the new hierarchy belonging to each of the classes $C_i$ in the main hierarchy is determined using the equations above as appropriate. At block 40, for each product, the product is assigned to the class with the highest value for $\Pr(C_i|p)$, unless, in some implementations as set forth further below in reference to FIG. 4, no class has a very high probability for that product.

In accordance with the present invention, the classification at block 40 is tentative. As recognized by the present invention, if two products are in the same node in the new hierarchy, they are more likely to belong to the same node in the main hierarchy. Accordingly, the process moves from block 40 to block 42 to determine the probability of each class given the node M of the product under test in the new hierarchy. In other words, the product classification can be based at least in part on how many products in a new hierarchy node are associated with the same node in the main hierarchy.

To do this, the products are first classified using $\Pr(C_i)$ as disclosed above, and then the relative posterior probability $\Pr(C_i|p,M)$ of class $C_i$ in the main hierarchy given a product "p" belonging to node M in the new hierarchy is determined at block 42 to be $\Pr(C_i|M) \times \Pr(p|C_i,M)$. $\Pr(p|C_i,M)$ is approximated as $\Pr(p|C_i)$, assuming that $\Pr(p|C_i)$ is independent of M. $\Pr(C_i|M)$ is estimated by the ratio of the number of products in class $C_i$ in the main hierarchy that were stored in node M in the new hierarchy, to the total number of products in the node M, raised to the power of "delta", typically a value of between one and one hundred. Intuitively, delta takes into account that some hierarchies may be close to the main hierarchy, and delta should be high for those, while others may be orthogonal in their organization, and delta should be small in those cases. The value of delta can be determined by presenting a small validation set to the user for manual classification: the examples in this set are chosen such that their classification would be different based on the value of delta.

The ratio discussed in the preceding paragraph can be further smoothed using a Laplace or Lidstone correction. At block 44, for each product in the node M under test, the product is reclassified using $\Pr(C_i|M)$ instead of $\Pr(C_i)$ in the classification model disclosed above.

FIG. 4 shows that if desired, at decision diamond 46 it can be determined whether more than two classes (nodes) have high probabilities for a product, e.g., probabilities that exceed a threshold. If so, the product can be classified into both nodes at block 48. In contrast, at decision diamond 50 it is determined whether no class has a high probability, e.g., whether no class has a probability equal to a threshold. If this is the case, the product need not be classified at all at block 54, but rather flagged for manual classification. Otherwise, the logic ends at state 52.

The logic can flow from block 54 to decision diamond 56 wherein it is determined whether a node M in the new hierarchy has more than a threshold number of products that have not been classified. If so, the node M can be designated as a candidate node for the main hierarchy at block 58.

While the particular METHOD AND SYSTEM FOR MERGING HIERARCHIES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A computer-implemented method for associating product information in a first hierarchy having a first structure with a second hierarchy having a second structure different than the first structure, comprising the acts of:

generating a classifier using text and attributes associated with product information in the second hierarchy; and using the classifier, associating at least some product information in the first hierarchy with nodes in the second hierarchy, wherein the generating act includes multiplying at least one probability based at least partially on a product information text by at least one probability based at least partially on a product information numerical attribute.

2. The method of claim 1, wherein the classifier is a Naive-Bayes classifier.

3. A computer-implemented method for merging product information in a first hierarchy having a first structure into a second hierarchy having a second structure different than the first structure, comprising the acts of:

generating a classifier using text and attributes associated with product information in the second hierarchy; and using the classifier, merging at least some product information in the first hierarchy with nodes in the second hierarchy, wherein the merging act includes associating product information on a product in the first hierarchy with at least one node in the second hierarchy corresponding to a highest classification probability for the product.

4. A computer-implemented method for associating product information in a first hierarchy having a first structure with a second hierarchy having a second structure different than the first structure, comprising the acts of:

generating a classifier using text and attributes associated with product information in the second hierarchy; and using the classifier, associating at least some product information in the first hierarchy with nodes in the second hierarchy, further comprising associating a high score product in the first hierarchy with at least two high score nodes in the second hierarchy when each high score node corresponds to a classification probability for the high score product exceeding a threshold.

5. A computer-implemented method for merging product information in a first hierarchy having a first structure into a second hierarchy having a second structure different than the first structure, comprising the acts of:

generating a classifier using text and attributes associated with product information in the second hierarchy; and using the classifier, merging at least some product information in the first hierarchy with nodes in the second hierarchy, wherein product information on at least one low score product in the first hierarchy is not associated with a node in the second hierarchy when no node in the second hierarchy is associated with a classification probability for the low score product exceeding a threshold.

6. A computer-implemented method for merging product information in a first hierarchy having a first structure into a second hierarchy having a second structure different than the first structure, comprising the acts of:

generating a classifier using text and attributes associated with product information in the second hierarchy; and using the classifier, merging at least some product information in the first hierarchy with nodes in the second hierarchy, further comprising designating a low score node in the first hierarchy as a node in the second hierarchy when the low score node contains at least a threshold number of low score products.

7. A computer-implemented method for merging product information in a first hierarchy having a first structure into a second hierarchy having a second structure different than the first structure, comprising the acts of:

generating a classifier using text and attributes associated with product information in the second hierarchy; and using the classifier, merging at least some product information in the first hierarchy with nodes in the second hierarchy, wherein product information on at least one product from a first node in the first hierarchy is associated with a second node in the second hierarchy based at least in part on how many products in the first node are associated with the second node.

8. A computer system including a program of instructions including structure to undertake system acts comprising:

receiving a main hierarchy having nodes representing product classes;

receiving a new hierarchy having nodes representing product classes;

generating a Naive-Bayes classifier using the main hierarchy; and associating products in the new hierarchy with nodes in the main hierarchy using the classifier, wherein the act of generating undertaken by the program includes multiplying at least one probability based at least partially on a product information text by at least one probability based at least partially on a product information numerical attribute.

9. The system of claim 8, wherein the act of generating undertaken by the program includes generating the classifier using text and attributes associated with product information in the main hierarchy.

10. A computer system including a program of instructions including structure to undertake system acts comprising:

receiving a main hierarchy having nodes representing product classes;

receiving a new hierarchy having nodes representing product classes;

generating a Naive-Bayes classifier using the main hierarchy; and associating products in the new hierarchy with nodes in the main hierarchy using the classifier, wherein the act of associating undertaken by the program includes associating product information on a product in the new hierarchy with at least one node in the main hierarchy corresponding to a highest classification probability for the product.

11. A computer system including a program of instructions including structure to undertake system acts comprising:

receiving a main hierarchy having nodes representing product classes;

receiving a new hierarchy having nodes representing product classes;

generating a Naive-Bayes classifier using the main hierarchy; and associating products in the new hierarchy with nodes in the main hierarchy using the classifier, wherein the acts undertaken by the program further comprise associating a high score product in the new hierarchy with at least two high score nodes in the main hierarchy when each high score node corresponds to a classification probability for the high score product exceeding a threshold.

12. A computer system including a program of instructions including structure to undertake system acts comprising:

receiving a main hierarchy having nodes representing product classes;

receiving a new hierarchy having nodes representing product classes;

generating a Naive-Bayes classifier using the main hierarchy; and associating products in the new hierarchy with nodes in the main hierarchy using the classifier, wherein product information on at least one low score product in the new hierarchy is not associated with a node in the main hierarchy when no node in the main hierarchy is associated with a classification probability for the low score product exceeding a threshold.

13. A computer system including a program of instructions including structure to undertake system acts comprising:

receiving a main hierarchy having nodes representing product classes;

receiving a new hierarchy having nodes representing product classes;

generating a Naive-Bayes classifier using the main hierarchy; and associating products in the new hierarchy with nodes in the main hierarchy using the classifier, wherein the acts undertaken by the program further include designating a low score node in the new hierarchy as a node in the main hierarchy when the low score node contains at least a threshold number of low score products.

14. A computer system including a program of instructions including structure to undertake system acts comprising:

receiving a main hierarchy having nodes representing product classes;

receiving a new hierarchy having nodes representing product classes;

generating a Naive-Bayes classifier using the main hierarchy; and associating products in the new hierarchy with nodes in the main hierarchy using the classifier, wherein product information on at least one product from a first node in the new hierarchy is associated with a second node in the main hierarchy based at least in part on how many products in the first node are associated with the second node.

15. A system storage device including system readable code readable by a computer for associating products in a new hierarchy with product classification nodes in a main hierarchy, comprising:

computer readable code means for generating a Naive Bayes classifier based at least in part on hierarchy training data containing both text and attributes; and computer readable code means for using the classifier and a determination of how many products in at least a first node in the new hierarchy are associated with at least a second node in the main hierarchy to associate products in the new hierarchy with product classification nodes in the main hierarchy, wherein the means for using associates products in the new hierarchy with one or more nodes in the main hierarchy corresponding to highest classification probabilities for the products.

16. The device of claim 15, wherein the training data includes product information in the main hierarchy.

17. The device of claim 16, wherein the means for using does not associate a low score product in the new hierarchy with a node in the main hierarchy when no node in the main hierarchy is associated with a classification probability for the low score product exceeding a threshold.

18. The device of claim 17, further comprising computer readable code means for designating a low score node in the new hierarchy as a node in the main hierarchy when the low score node contains at least a threshold number of low score products.

19. The device of claim 15, wherein the means for using associates a high score product in the new hierarchy with at least two high score nodes in the main hierarchy when each high score node corresponds to a classification probability for the high score product exceeding a threshold.

20. A computer-implemented method for associating product information in a first hierarchy having a first structure with a second hierarchy having a second structure different than the first structure, comprising the acts of:

generating a classifier using text and attributes associated with product information in the second hierarchy; and using the classifier, associating at least some product information in the first hierarchy with nodes in the second hierarchy, wherein the classifier takes into account that products in the same node in the first hierarchy are likely to belong to the same node in the second hierarchy.

* * * * *